United States Patent
Imai et al.

(10) Patent No.: US 7,098,799 B2
(45) Date of Patent: Aug. 29, 2006

(54) UNIT FOR SENSING PHYSICAL QUANTITY

(75) Inventors: Masahito Imai, Chita (JP); Takeshi Shinoda, Anjo (JP)

(73) Assignee: Denso Corporation, Kariya (JP)

( * ) Notice: Subject to any disclaimer, the term of this patent is extended or adjusted under 35 U.S.C. 154(b) by 118 days.

(21) Appl. No.: 10/808,428

(22) Filed: Mar. 25, 2004

(65) Prior Publication Data

US 2004/0189480 A1 Sep. 30, 2004

(30) Foreign Application Priority Data

Mar. 25, 2003 (JP) ............................. 2003-082646

(51) Int. Cl.
*G08B 21/00* (2006.01)

(52) U.S. Cl. ...................... 340/660; 340/661; 340/663; 340/636.15

(58) Field of Classification Search ................ 340/660, 340/661, 663, 636.15, 510, 511, 508
See application file for complete search history.

(56) References Cited

U.S. PATENT DOCUMENTS

| | | | | |
|---|---|---|---|---|
| 4,186,390 A | * | 1/1980 | Enemark | 340/630 |
| 4,316,097 A | * | 2/1982 | Reynolds | 307/66 |
| 4,598,243 A | * | 7/1986 | Kawakami | 323/349 |
| 4,618,857 A | * | 10/1986 | Dubois et al. | 340/654 |
| 4,990,885 A | * | 2/1991 | Irick et al. | 340/455 |
| 5,075,620 A | * | 12/1991 | Shaw | 324/122 |
| 6,401,018 B1 | | 6/2002 | Oba et al. | |
| 2005/0174249 A1 | * | 8/2005 | Weder | 340/661 |

FOREIGN PATENT DOCUMENTS

| | | |
|---|---|---|
| JP | 60-119470 | 6/1985 |
| JP | 61-191630 | 11/1986 |
| JP | 2001-183164 | 7/2001 |

* cited by examiner

*Primary Examiner*—Thomas Mullen
*Assistant Examiner*—Travis Hunnings
(74) *Attorney, Agent, or Firm*—Posz Law Group, PLC (57) ABSTRACT

A sensor unit sensing a physical quantity comprises a first voltage evaluation circuit, a second voltage evaluation circuit, an alarm signal output circuit, and a sensor output circuit. The first voltage evaluation circuit evaluates a power voltage by comparing it with a reference voltage and outputs an accident signal when the power voltage is lower than a first predetermined voltage. The second voltage evaluation circuit working in a lower voltage range in which the first voltage evaluation circuit is insensitive outputs the accident signal when the power voltage is lower than a second predetermined voltage. The alarm signal output circuit outputs an alarm signal in response to the accident signal. The sensor output circuit outputs a sensor signal and inhibits the circuit from outputting the sensor signal in response to the accident signal, so that the alarm signal output circuit provides the alarm signal in response to the accident signal.

13 Claims, 5 Drawing Sheets

UNIT FOR SENSING PHYSICAL QUANTITY

BACKGROUND OF THE INVENTION

1. Technical Field of the Invention

The present invention relates to a unit for sensing physical quantity, and more particularly to a unit for sensing a hydraulic pressure which has a failure diagnosis function for an abnormal power voltage.

2. Background Art

In general, a hydraulic brake system mounted on a vehicle is provided with a pressure sensor to sense pressure handled by the system. The pressure sensor unit has, for example, an arrangement to transform pressure in a brake pipe into a voltage signal by a hydraulic pressure sensor and output the voltage signal to an external control unit such as an ECU (Electric Control Unit) through, for example, a buffer circuit and an amplifier. Thus far, to enhance the detection reliability of the pressure sensor unit, a plurality of hydraulic pressure sensors are set up in the same brake pipe system. The voltage differences among the voltages from each hydraulic pressure sensor are sensed to compare the differences with a predetermined value by an external control unit for failure diagnosis of the hydraulic brake system. On the other hand, a recent requirement is for a pressure sensor unit with a failure diagnosis function which has the same level of detecting ability with the plurality of hydraulic pressure sensors.

As one of the pressure sensor units introduced in the above, a pressure sensor unit with the failure diagnosis function to detect a disconnection of a wiring harness (for power line, signal line, and ground line in general), connecting the pressure sensor unit and the external control unit, and defective contact at the wiring harness (for example, linking-up connector part, solder part) has been shipped hitherto. In the pressure sensor unit like the above, one of the arrangement may be like below. For example, the voltage difference between the power line and the ground line is monitored. If the difference becomes lower than a predetermined value, an accident occurrence is informed to the external control unit by forcibly shifting the output voltage of the sensor unit from a normal output voltage range to out of the normal range as an accident signal. However, in this arrangement, when the voltage difference becomes lower than the predetermined value, it is impossible to clarify the reason of the voltage lowering if the lowering is due to the voltage lowering of the power line (by increase of impedance of the power line.), or due to the voltage raising of the ground line (by increase of impedance of the ground line). As a result, if the accident signal is fixed at either a high voltage side or a low voltage side, the accident signal will fall into a normal output voltage range of the pressure sensor, resulting in an evaluation impossibility if the accident has happened or not.

Considering the above issue, the following physical quantity sensor unit has been developed (For example, Japanese Patent First Publication No. 2001-183164). The physical quantity sensor unit includes a power monitoring circuit and an oscillator circuit. The voltage difference between the power line and the ground line is monitored. If the voltage difference becomes lower than a predetermined value, the power monitoring circuit outputs an accident signal, and the oscillator circuit starts operation in response to the accident signal and outputs a high level signal and a low level signal alternately at predetermined periods.

The guaranteed operation voltage of the physical quantity sensor written in the Japanese Patent First Publication No. 2001-183164 is about 3V. Then, if the power voltage is lowered to below 3V, the physical quantity sensor becomes impossible to output the accident signal. As a result, an abnormality of the power voltage caused by a defective contact at a connecting portion of the power line and/or the ground line can not be detected in a wide voltage range, resulting in less reliability of the failure diagnosis function.

SUMMARY OF THE INVENTION

The present invention has been made considering the above issue in the background art. It is therefore an object of the present invention to provide a physical quantity sensor unit which is able to detect an abnormality of the power voltage over a wide voltage range, and accordingly, to provide a physical quantity sensor unit which has a function of diagnosing a failure in the unit in a reliable manner.

In order to accomplish the above object, as a first aspect of the present invention, there is provided an alarm unit incorporated in an electric system to which a power voltage is supplied, the alarm unit comprising: a first voltage evaluation circuit evaluating the power voltage by comparing the power voltage with a reference voltage independent from the power voltage, thereby outputting an accident state signal when the power voltage is lower than a first predetermined voltage; a second voltage evaluation circuit, which works in a predetermined voltage rang in which the first voltage evaluation circuit is insensitive to an operation thereof, evaluating the power voltage by comparing the power voltage with an upper limit of the predetermined voltage range, thereby outputting the accident state signal when the power voltage is lower than the upper limit smaller than the first predetermined voltage; and an alarm signal output circuit outputting an alarm signal in response to the outputted accident state signal.

The configuration according to the first aspect of the present invention is applicable to all electric systems which have a power voltage supply.

As a second aspect of the present invention, there is provided a sensor unit incorporated in an electric system to which a power voltage is supplied, the sensor unit having a sensor circuit sensing a physical quantity to output a sensor signal responding to the sensed physical quantity, comprising: a first voltage evaluation circuit evaluating the power voltage by comparing the power voltage with a reference voltage independent from the power voltage, thereby outputting an accident state signal when the power voltage is lower than a first predetermined voltage; a second voltage evaluation circuit, which works in a predetermined voltage range in which the first voltage evaluation circuit is insensitive to an operation thereof, evaluating the power voltage by comparing the power voltage with an upper limit of the predetermined voltage range, thereby outputting the accident state signal when the power voltage is lower than the upper limit smaller than the first predetermined voltage; and an alarm signal output circuit outputting an alarm signal in response to the outputted accident state signal.

It is preferred that the sensor unit according to the second aspect further comprises an output circuit outputting a sensor output voltage depending on the sensor signal outputted from the sensor circuit when the power voltage is over the first predetermined voltage and also inhibiting the output circuit from outputting the sensor output voltage in response to an output of the accident state signal, so that the alarm signal output circuit provides the alarm signal when the power voltage is equal to or below the first predetermined voltage.

If, at least one of the power line and the ground line, through which the power is supplied to the physical quantity sensor unit from an external control system, has a defective contact at the connecting portion, the power voltage becomes low. If the power voltage becomes lower than a predetermined value, the accident state signal is outputted from the first voltage evaluation circuit, and as a result, the alarm signal is outputted from the output circuit in response to the accident state signal. The first voltage evaluation circuit has a comparator for outputting the accident state signal based on the comparison between the power voltage and the reference voltage which is independent of the power voltage. Accordingly, a precise evaluation is executed if the power voltage is lower than the predetermined voltage or not. Furthermore, the alarm signal from the output circuit has a higher voltage than the maximum voltage of the sensor output voltage responding to the sensor signal with a predetermined margin. The sensor signal is amplified in the output circuit. As a result, the alarm signal is clearly distinguished from the sensor output voltage outputted from the output circuit, resulting in precise detection of an abnormality of the power voltage.

On the other hand, if the power voltage is lowered below the operation voltage of the comparator, the second voltage evaluation circuit outputs the accident state signal in response to the operation of a switching element, and as a result, the alarm signal is outputted from the output circuit. Then, an abnormality of the power voltage is detected in a wide voltage range by the operation of the first voltage evaluation circuit and the second voltage evaluation circuit. Accordingly, a reliable failure diagnosis function for detecting an abnormality of the power voltage is realized.

Preferably, the second aspect of the present invention may comprise a clamping circuit for clamping the sensor output voltage from the output circuit at a voltage level distinguished from the alarm signal voltage. The clamping circuit is configured to freeze an operation thereof if the accident state signal is outputted.

The clamping circuit is set up for clamping the maximum voltage outputted from the output circuit below the voltage of the alarm signal with a predetermined margin. Then, a distinct detection for the difference between the alarm signal and the sensor output voltage responding to the sensor signal outputted from the output circuit is always achieved without fail.

Operation of the clamping circuit is stopped if the accident state signal is outputted. Then, a harmful effect by the clamping circuit on the alarm signal can be avoided.

In the second aspect of the present invention, it is still preferred that the alarm signal voltage is a divided voltage produced by dividing an output voltage of a stabilized power supply independent from the sensor unit by ratios of resistances between a pull-up resistor and a plurality of dividing resistors in the output circuit, the pull-up resistor being configured to connect a signal line of the output circuit and the stabilized power supply.

The divided voltage is outputted as the alarm signal even if the power voltage becomes almost zero or close to zero.

The second aspect of the present invention is able to apply to a physical quantity sensor unit for detecting an abnormality of the power voltage thereof in a wide range of the power voltage.

As a result, an alarm signal, which indicates an abnormality of the power voltage, is outputted effectively in a wide voltage range of the power voltage from zero level to a predetermined standard voltage. Accordingly, a reliability of a failure diagnosis function of a physical quantity sensor unit for detecting an abnormality of a power voltage can be increased.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but is for the purpose of explanation and understanding only.

In the drawings.

DESCRIPTION OF THE PREFERRED EMBODIMENTS

Figure 1:
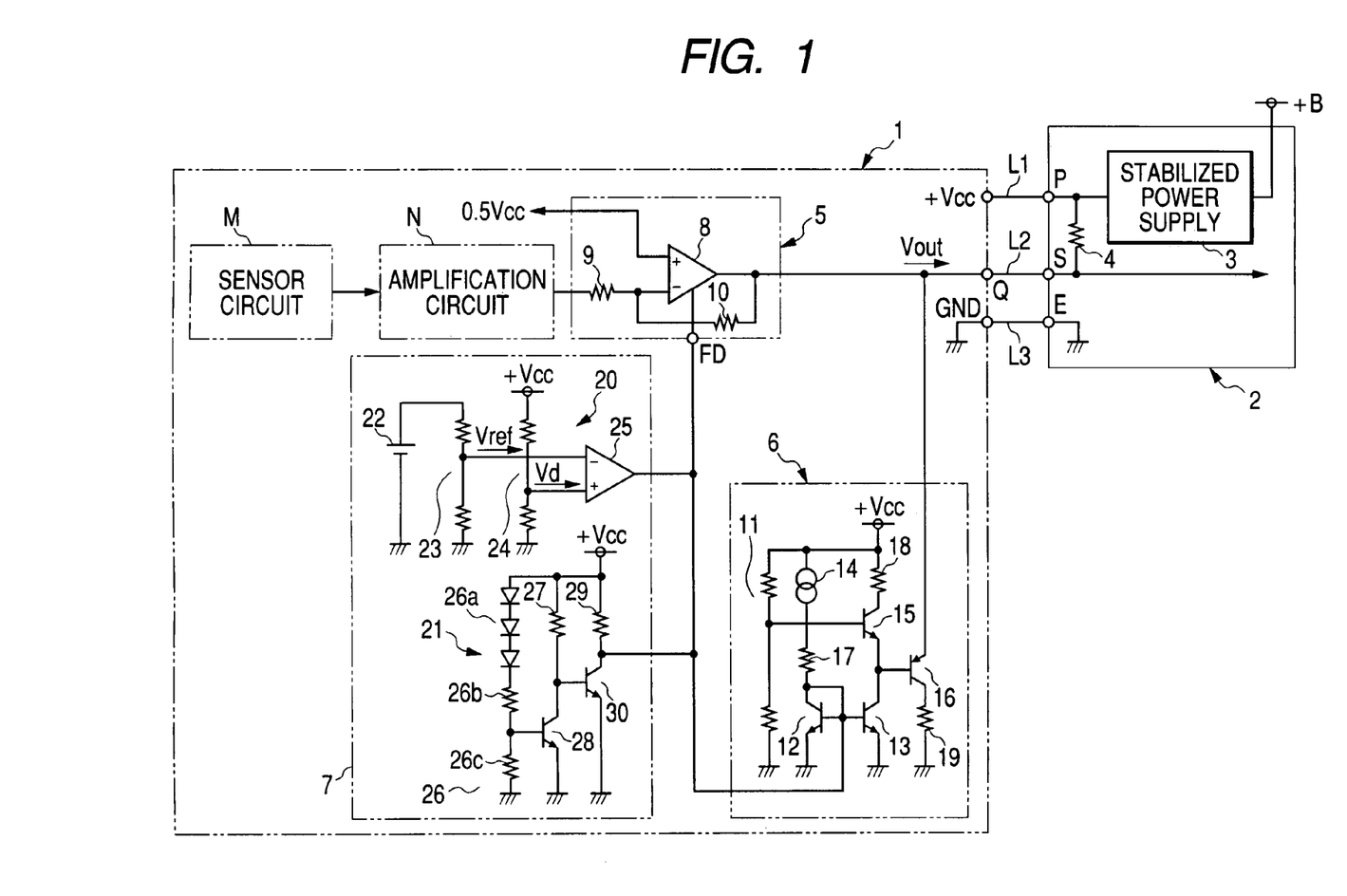
FIG. 1 is a block diagram showing a circuit of the embodiment

An embodiment of the present invention is described below by referring the accompanying drawings. In FIG. 1, a circuitry and the related electric arrangement of the main part of a pressure sensor unit for an on-vehicle hydraulic brake system is shown. As shown, the pressure sensor unit 1 (corresponds to a physical quantity sensor unit) is connected to an external control unit ECU 2 through a wiring harness.

Figure 2A:
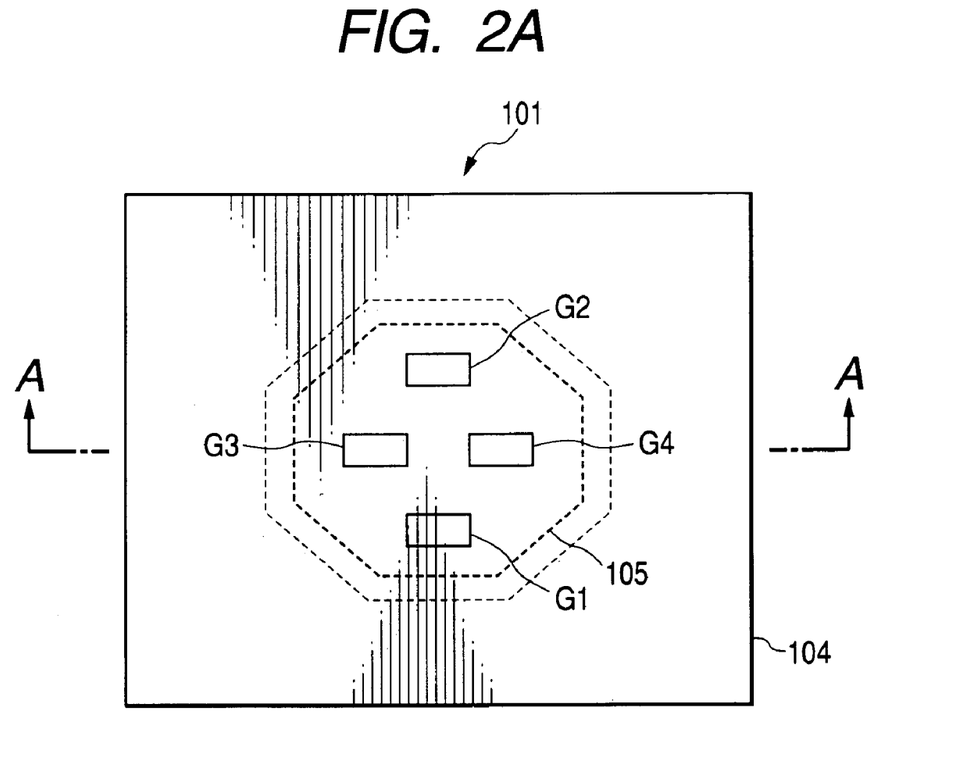
FIG. 2A is a top view of a semiconductor sensor of the embodiment
Figure 2B:
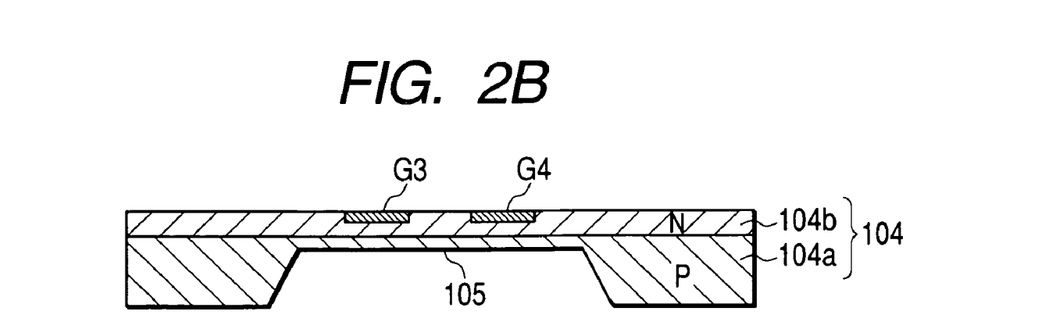
FIG. 2B is a cross section of a semiconductor sensor of the embodiment cut along an A—A line in FIG. 2A

FIG. 2A and FIG. 2B show an example of the arrangement of a semiconductor pressure sensor unit 101 fabricated based on a concept of the present invention. FIG. 2A is a top view and FIG. 2B is a cross section cut along an A—A line in the FIG. 2A of the semiconductor pressure sensor 101 respectively.

As shown in FIG. 2A, the semiconductor pressure sensors 101 is fabricated on a silicon substrate 104. The silicon substrate 104 is composed of a N type epitaxial layer 104$b$ on a P type silicon substrate 104$a$. The center part of the P type silicon substrate 104$a$ is thinned, and the center part and N type epitaxial layer 104$b$ form a thin diaphragm 105.

Figure 3:
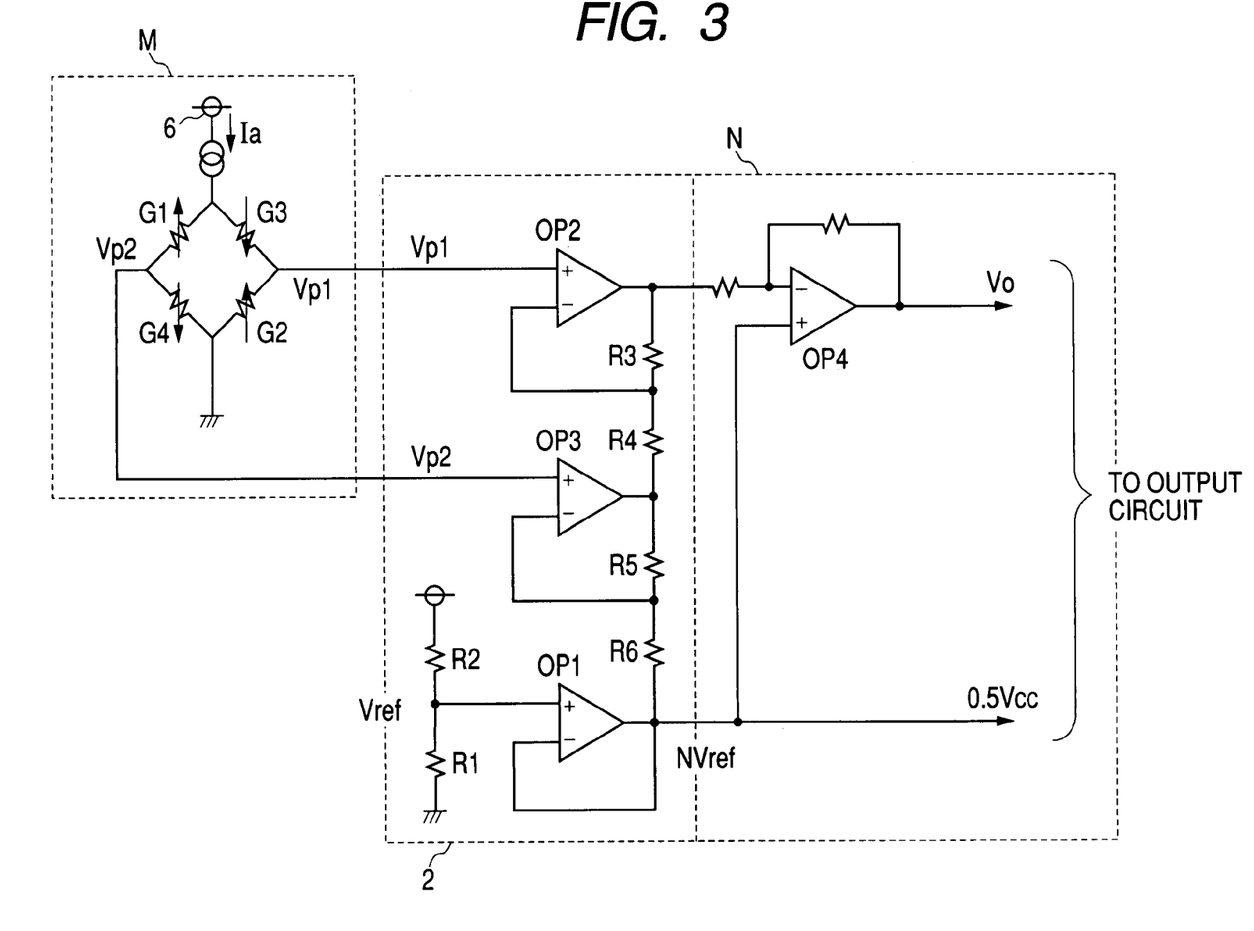
FIG. 3 is a block diagram showing a pressure sensor circuit of the embodiment

Piezoresistance elements G1~G4 are fabricated on the thin diaphragm 105 by diffusing a P type dopant in the thin diaphragm 105. If the diaphragm is stressed, the diaphragm 105 and the piezoresistance elements G1~G4 are distorted, and as a result, for example, resistances of the piezoresistance elements G1 and G2 become higher, and those of the G3 and G4 become lower. The piezoresistance elements G1~G4 are connected to form a bridge circuit as shown in FIG. 3.

Constant current Ia is supplied from a constant current source 6 to a connected point of the piezoresistance elements G1 and G3 in the bridge circuit. If the diaphragm 105 is stressed, voltage Vp1 at the connected point of the piezoresistance elements G2 and G3 becomes higher and, on the other hand, voltage Vp2 at a connected point of elements G1 and G4 becomes lower. A value of the difference Vp1–Vp2 is almost proportional to the stress added to the diaphragm 105.

The voltage difference Vp1–Vp2 is amplified by a differential amplification circuit 2 and the amplified voltage V0 is outputted. There are many types of differential amplification circuits. The differential amplification circuit 2 shown in FIG. 3 has two operational amplifiers OP2 and OP3 and four resistors R3~R6. The voltages Vp1 and Vp2 at the connecting points in the bridge circuit are inputted to the noninversion input terminals of the OP2 and OP3 respectively. The resistors R3~R6 are placed in series between the output terminal of the OP2 and a mutual connection node NVref where the voltage is higher than that of the ground with a standard voltage Vref. One end of the resistor R3 is also connected to the output terminal of the operational amplifier OP2 and the other end is connected to the inversion input terminal of the OP2. In addition, one end of the resistor R5 is connected to the output terminal of the operational amplifier OP3 and the other end is connected to the inversion input terminal of the OP3. One of the ends of the resistor R6 is connected to the mutual connection node NVref. The voltage difference between the output terminal of the operational amplifier OP2 and the mutual connection node NVref is the output voltage V0 of the differential amplification circuit 2. If each of the resistors of the R3~R6 has an equal value, the output voltage V0 will be 2(Vp1–Vp2).

Practically, a stabilized power supply 3 is set up in the external control unit ECU 2 to transform an output voltage from the in-vehicle battery +B into a predetermined voltage (5 V in this embodiment). An output terminal P of the stabilized power supply 3 is connected to the power terminal +Vcc of the pressure sensor unit 1 through a power line L1. Also, a signal input terminal S which receives the sensor output voltage corresponding to a detected physical quantity (pressure), and a ground terminal E are set up in the ECU2. A signal output terminal Q and a ground terminal GND in the pressure sensor unit 1 are connected to the signal input terminal S and the ground terminal E through a signal line L2 and a ground line L3. In addition, the terminal S of the ECU 2 is connected to the output terminal P of the stabilized power supply 3 through a pull-up resistor 4.

An output circuit 5, a clamping circuit 6, a power monitoring circuit 7, a sensor circuit M, and an amplification circuit N in the pressure sensor unit 1 are illustrated in FIG. 1. The output circuit 5 includes an operational amplifier 8, which functions as an inversion amplifier, outputs the amplified voltage signal Vout to the signal output terminal Q. The operational amplifier 8 is configured to receive the sensor signal to the inversion input terminal (−) through a resistor 9 (functioning as a voltage divider), and a standard voltage (0.5 Vcc in this embodiment) to the noninverion input terminal (+). A resistor 10 (functioning as a voltage divider) for negative feedback is also connected to the amplifier 8. Although not shown, the amplifier 8 includes a bipolar transistor which has an open-collector output terminal at the output stage. The amplifier 8 is configured to make OFF the bipolar transistor forcibly (output inhibiting function) if an input signal to the output-disable terminal FD is lowered to a low level. The amplifier 8 is a type of single power source. The power is supplied through the power terminal +Vcc.

Not shown, a hydraulic pressure sensor, which is configured to sense the pressure in a brake pipe, functions when power is supplied through the power terminal +Vcc and outputs a sensor signal voltage corresponding to the sensed pressure. The sensor signal voltage is sent to the inversion input terminal (−) of the operational amplifier 8 through the resistor 9 after transforming the sensor signal voltage into a sensor signal output which is characterized by shifting to the low voltage side inversely proportional to the increase of the sensed pressure. The transforming of the sensor signal voltage is implemented by a signal processing circuit including, for example, a differential amplification circuit. The amount of the shift of the sensor signal output to the low voltage side is an order of 1 V. The variation of the sensor signal voltage from the hydraulic pressure sensor is directly proportional to the variation of the power voltage with the same ratio between the sensor signal voltage and the power voltage. That is, the sensor signal voltage has a ratiometric characteristic to the power voltage. As a result, the variation of the sensor signal output to be given to the operational amplifier 8 is also directly proportional to the variation of the power voltage. That is, the sensor signal output is also retiometric to the power voltage.

Although not shown, a standard voltage to be given to the noninversion input terminal (+) of the operational amplifier 8 is a divided voltage produced by using the power voltage at the power terminal +Vcc by a voltage divider circuit. The standard voltage is outputted through a buffer circuit at the subsequent stage.

A clamping circuit 6 is provided to clamp the sensor output voltage Vout outputted from the output circuit 5 to a predetermined upper limit voltage. The clamping circuit 6 is one of the well known circuits. The circuit 6 comprises a voltage divider circuit 11 for dividing the power voltage at the source power terminal +Vcc, npn bipolar transistors 12 and 13 forming a current mirror circuit, a constant current circuit 14, a npn bipolar transistor 15 base-biased by an output voltage produced by the voltage divider circuit 11, a npn bipolar transistor 16 for clamping the sensor output voltage, the transistor 16 being supplied base-current through the transistor 13, and resistors 17, 18 and 19. The emitter of the transistor 16 is connected to the signal output terminal Q. The collector of the transistor 16 is connected to a ground terminal through the resistor 19.

In the clamping circuit 6 having the arrangement introduced in the above, the transistor 16 switches to ON when the voltage at the signal output terminal Q (emitter voltage of the transistor 16) is higher than the divided voltage produced by the voltage divider circuit 11. Upon the switching ON of the transistor 16, the claming is implemented. In this embodiment, the clamping voltage by the clamping circuit is set at a voltage lower than an abnormal diagnosis signal voltage (about 4.6 V. This will be described later. The abnormal diagnosis signal corresponds to the alarm signal of the present invention.) with a predetermined margin, for example, 4.3 V, which is 0.3 V lower than the 4.6 V.

The power monitoring circuit 7 is provided for monitoring the power voltage (voltage at the power terminal +Vcc). The circuit 7 is composed of a first voltage evaluation circuit 20 and a second voltage evaluation circuit 21.

The first voltage evaluation circuit comprises a constant voltage circuit 22 producing a constant voltage independent of the power voltage, a first voltage divider circuit 23 producing a standard voltage Vref by dividing the output voltage of the circuit 22, a second voltage divider circuit 24 producing a monitoring voltage Vd which is proportional to the power voltage, and a comparator 25 comparing the standard voltage Vref and the monitoring voltage Vd. The comparator 25 is composed of a single power source type of operational amplifier with a bipolar transistor which has an open-collector terminal at the output stage. The comparator 25 is supplied with power through the power terminal +Vcc.

The first voltage evaluation circuit 20 is configured to output an accidental state signal if the power voltage becomes lower than the lower limit of operation voltage (for example 5±0.25V) of the operational amplifier 8 in the output circuit 5. In this embodiment, considering a margin for an accidental error, a voltage to be judged as an accident occurring on the power voltage is set below 4.5 V. This is the lower limit of the predetermined power voltage. In other words, the first voltage evaluation circuit 20 is configured to output the accident state signal if the power voltage is lowered 10% from the normal power voltage (5 V), that is, the lower limit of the predetermined power voltage.

Practically, the comparator 25 is configured as follows. If Vref≦Vd, the transistor at the output stage of the comparator 25 is made OFF, and as a result, the comparator 25 becomes a high impedance state. On the other hand, if Vref>Vd, the transistor at the output stage is made ON, resulting in that the comparator 25 is switched to a low impedance state, which indicates an accident state. To implement this switching operation, the relation between the standard voltage Vref and the monitoring voltage Vd is set to be Vref>Vd if the power voltage is lowered below 4.5 V. The comparator 25 includes a feedback resistor for adding a hysteresis thereto in a practical circuit.

The output terminal (collector of the transistor at the output stage) of the comparator 25 is connected to the output-disable terminal FD of the operational amplifier 8 in the output circuit 5 and to the bases of transistors 12 and 13 in the clamping circuit 6. Accordingly, if an accident has happened with the power voltage (in the case of the power voltage below 4.5 V), a low level signal (ground level voltage+collector-emitter saturation voltage, hereinafter referred to as "VCEsat", of the output stage transistor) corresponding to the accident state is outputted from the comparator 25. Then, an input signal to the output-disable terminal FD of the amplifier 8 in the output circuit 5 is lowered to the low level, resulting in that the amplifier 8 is switched to an output inhibition state. In addition, the base voltages of the transistors 12 and 13 in the clamping circuit 6 are lowered to the low level, and the transistors 12 and 13 are stopped operation forcibly, resulting in stopping the operation of the clamping circuit 6.

The first voltage evaluation circuit 20 in the above configuration is able to evaluate precisely the accident state of the power voltage if the power voltage becomes below 4.5 V. However, the operational amplifier composing the comparator 25 does not operate if the power voltage is lowered below around 1.4 V because of out of the operation range of the amplifier. Then, if the power voltage is lowered below 1.4 V, the evaluation of the accident state becomes impossible. From the above reason, the second voltage evaluation circuit 21 is set up against the above issue.

The second voltage evaluation circuit 21 is configured to output the accident state signal if the power voltage is lowered below, for example, 2 V, which is a voltage a predetermined margin is added to the lower limit of the operation voltage of the operational amplifier. The circuit 21 includes a voltage divider circuit 26 composed of a first series circuit having, for example, three diodes 26a, and resistors 26b and 26c in series to each other between the power terminal +Vcc and the ground terminal, a second series circuit in parallel with the voltage divider circuit 26 and being composed of a resistor 27 and a collector-emitter path of a npn bipolar transistor 28, and a third series circuit also in parallel with the voltage divider circuit 26 and being composed of a resistor 29 and a collector-emitter path of a npn bipolar transistor 30 (corresponds to a switching element). In addition, the base of the transistor 28 is connected to the output terminal (common connection point of the resistors 26b and 26c) of the voltage divider circuit 26 and the base of the transistor 30 is connected to the collector of the transistor 28.

The divider circuit 26 is configured like below. If the power voltage is higher than 2 V, the voltage divider circuit 26 outputs a divided voltage higher than the lower limit voltage to make the transistor 28 ON, and if the power voltage is lowered below 2 V, the circuit 26 outputs the divided voltage to make the transistor 28 OFF. Accordingly, if the power voltage is higher than the 2 V, the transistor 30 is kept ON, and the high level signal (the same voltage level of the power terminal +Vcc) is outputted from the collector of the transistor 30. However, if the power voltage is lowered below 2 V, a low level signal (ground level voltage+ VCEsat of the transistor 30) is outputted from the collector of the transistor 30 because the transistor 30 is made ON in response to the OFF of the transistor 28.

The collector of the transistor 30, that is, the signal output terminal of the second voltage evaluation circuit 21, is connected to the output-disable terminal FD of the operational amplifier 8 in the output circuit 5 and to the bases of the transistors 12 and 13 in the clamping circuit 6. Accordingly, if the second voltage evaluation circuit 21 detects an accident occurring (in the case of the power voltage below 2 V), the operational amplifier 8 in the output circuit 5 is switched to the output inhibition state in response to the low level accident state signal outputted from the collector of the transistor 30, at the same time, the clamping circuit 6 stops operation in response to the base voltages of the transistors 12 and 13 being lowered to the low level.

Figure 4:
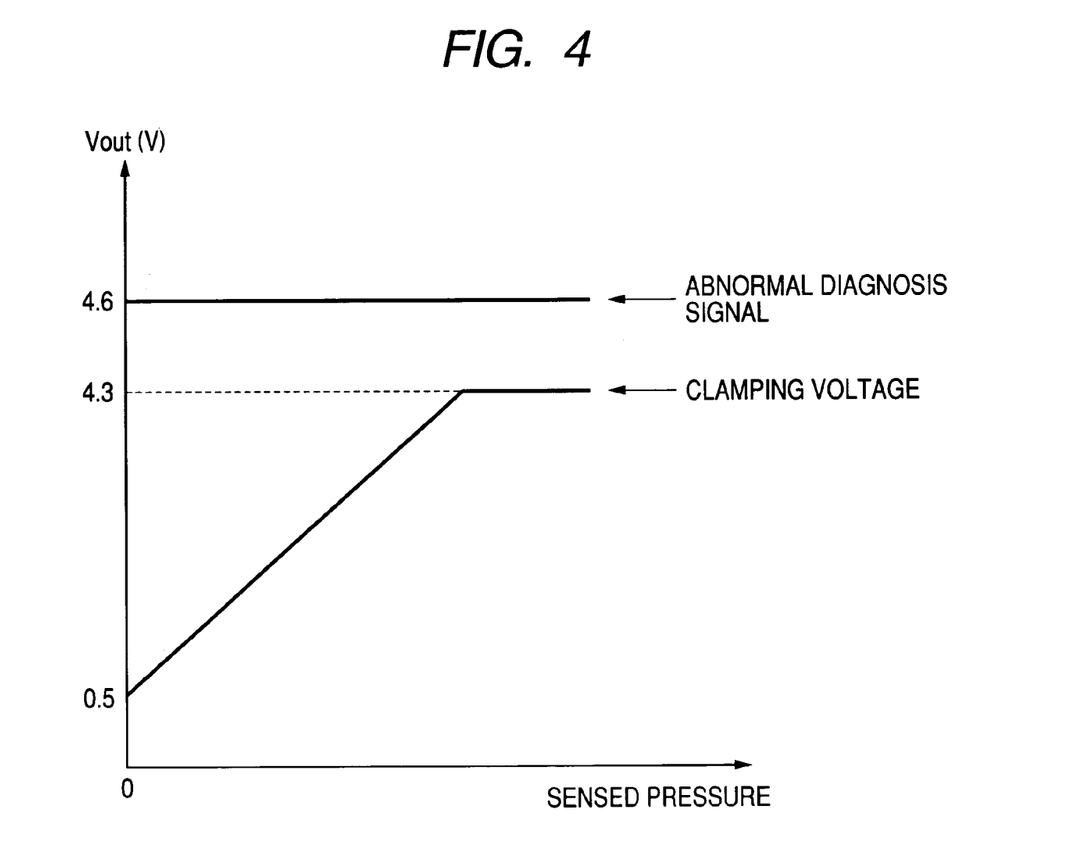
FIG. 4 is a relation between a sensed pressure by a hydraulic pressure sensor and an output voltage outputted from an output circuit.
Figure 5:
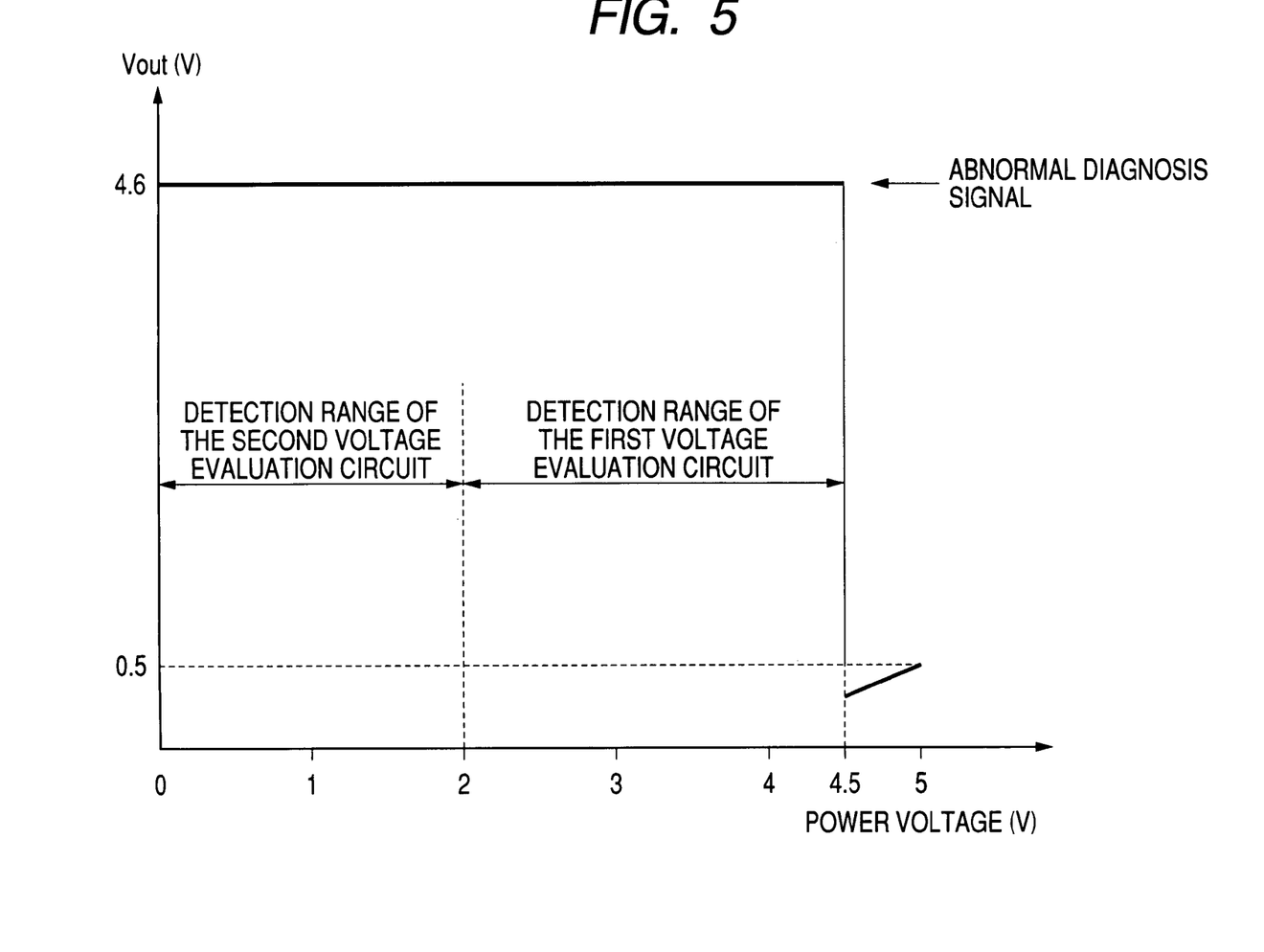
FIG. 5 is a relation between an output voltage Vout(V) outputted from an output circuit and power voltage V.

Referring to FIG. 4, functions of the above circuits will be described below. The figure shows a relation between the sensed pressure by the hydraulic pressure sensor and the sensor output voltage Vout from the output circuit 5.

If power is supplied to the ECU 2, the output power (The voltage is 5 V.) from the stabilized power supply 3 is supplied between the power terminal +Vcc and the ground terminal GND in the pressure sensor system 1 through the power line L1 and the ground line L3, thereby the pressure sensor system 1 is made ON. If the power line L1 and the ground line L3 are connected normally, the voltage at the terminal +Vcc in the pressure sensor unit 1 is 5 V. In the normal conditions, the sensor output voltage Vout, which is an inversed and amplified signal of the sensor signal output (The sensor signal output shifts to minus side inversely proportional to the increase of the sensed pressure.), is outputted from the output circuit 5. As shown in FIG. 4, the sensor output voltage Vout increases proportional to the increase of the sensed pressure. However, the sensor output voltage Vout is clamped at 4.3 V by the clamping circuit 6 not to increase beyond 4.3 V.

On the other hand, if the power line L1 and/or the ground line L3 has a defective contact at the connecting part, and as a result, if the power voltage of the pressure sensor unit 1 is lowered below 4.5 V, the power voltage is assumed to be as an accident state by the first voltage evaluation circuit 20 in the power monitoring circuit 7. Then, the accident state signal (low level signal) is outputted from the comparator 25 in the first voltage evaluation circuit 20. The accident state signal is sent to the output-disable terminal FD of the operational amplifier 8 in the output circuit 5 and the bases of the transistors 12 and 13 in the clamping circuit 6. Accordingly, the transistor at the output stage of the amplifier 8 in the output circuit 5 is forcibly made OFF, resulting in that the amplifier 8 is switched to the output inhibition state. The transistors 12 and 13 in the clamping circuit 6 are also forcibly made OFF, and as a result, the transistor 16 is kept OFF, resulting in operation stop of the clamping circuit 6.

If the transistor at the output stage of the operational amplifier 8 is made OFF (The open-collector output terminal is at high impedance state), the voltage at the signal output terminal Q is switched to a divided voltage which is produced by dividing the voltage difference between the output voltage (5 V) of the stabilized power supply 3 and the input voltage of the inversion input terminal (−) in the amplifier 8 by a pull-up resistor 4 in the ECU 2, and an input resistor 9 and a feedback resistor 10 in the output circuit 5. In this embodiment, the resistance ratios between the pull-up resistor 4, the input resistor 9, and the feedback resistor 10 are so configured that the voltage at the signal output terminal Q becomes 4.6 V when the sensor signal output is 0 V (zero volt). Then, if the power voltage of the pressure sensor unit 1 is lowered below 4.5 V, the voltage signal of about 4.6 V, that is, an abnormal diagnosis signal (corresponds to an abnormal signal) indicating an accident occurring, is given to the ECU 2. The abnormal diagnosis signal has a voltage higher than the maximum sensor output voltage Vout (4.3 V) with a predetermined margin (about 0.3 V).

Furthermore, if the power voltage of the pressure sensor unit 1 becomes below 2 V, the transistor 30 in the second voltage evaluation circuit 21 is made ON, and the accident state signal is outputted from the circuit 21. Then, the accident state signal is given to the output-disable terminal FD of the operational amplifier 8 in the output circuit 5 and the bases of the transistors 12 and 13 in the clamping circuit 6. As a result, the operational amplifier 8 in the output circuit 5 is switched to the output inhibition state, and also the clamping circuit 6 stops operation. Accordingly, the abnormal diagnosis signal is given to the ECU 2.

The following advantages are realized by the present invention. The first voltage evaluation circuit 20 has the comparator 25. The comparator 25 is configured to output the accident state signal based on the comparison between the monitoring voltage Vd and the constant standard voltage Vref. The Vd is produced by dividing the power voltage. On the other hand, the Vref is independent from the power voltage. As a result, a precise evaluation becomes possible if the power voltage is lowered below the predetermined voltage (4.5 V) or not. Furthermore, the abnormal diagnosis signal outputted from the output circuit 5 has a higher voltage (about 4.6 V) than the maximum of the sensor output voltage Vout (4.3 V) with the predetermined margin (about 0.3 V). The Vout is outputted after amplifying the sensor signal output within the output circuit 5. Accordingly, it is possible to distinguish clearly the abnormal diagnosis signal from the sensor output voltage Vout, resulting in reliable detection of the abnormality of the power voltage.

As the clamping circuit 6 is set up for clamping the sensor output voltage Vout outputted from the output circuit 5 at the upper limit voltage (4.3 V), it is always possible to distinguish absolutely the abnormal diagnosis signal from the sensor output voltage Vout. In addition, since the clamping circuit stops operation when the abnormal diagnosis signal is being outputted, the clamping circuit does not have any undesirable effect on the voltage of the abnormal diagnosis signal.

Also, if the power voltage becomes lower than the operational range (2 V) of the comparator 25, the accident state signal is outputted from the second voltage evaluation circuit 21 in response to the operation of the transistor 30 in the circuit 21. As a result, the abnormal diagnosis signal is outputted from the output circuit 5. Accordingly, it is possible to detect an abnormal signal of the power voltage effectively in a wide voltage range, thereby a reliable failure diagnosis for detecting an abnormality of the power voltage is realized.

In this embodiment, if the open-collector output terminal of the output circuit 5 is switched to the high impedance state, the divided voltage, which is produced by dividing the output voltage of the stabilized power supply 3 in the ECU 2 by the pull-up resistor 4 in the ECU 2, and the input resistor 9 and the feedback resistor 10 in the output circuit 5, is outputted as the abnormal diagnosis signal. Then, even if the power voltage is lowered to close to zero, the divided voltage is outputted as the abnormal diagnosis signal by using the stabilized power supply 3 in the ECU 2. Accordingly, the abnormal diagnosis signal can be outputted effectively and widely, ranging from close to zero to a predetermined voltage of the power voltage. As a result, a reliable failure diagnosis for detecting an abnormality of the power voltage is realized.

MODIFICATIONS

The present invention may be embodied in other specific forms without departing from the spirit or essential characteristics. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein. It is possible to implement many other modified, or improved embodiments by skilled people.

The application of the present invention is not limited to the pressure sensor unit applied to the in-vehicle hydraulic brake system. The invention is also applicable to many other physical quantity sensor units which use the sensor output signal responsive to the sensed physical quantity. The clamping circuit may be set up if needed. It is also obvious that the circuitry in the output circuit 5 is not limited to the type of the operational amplifier 8 functioning as an inversion type of amplifier.

What is claimed is:

1. An alarm unit incorporated in an electric system to which a power voltage is supplied, the alarm unit comprising:
   a first voltage evaluation circuit, which determines whether or not the power voltage is lower than a first predetermined voltage and outputs a first accident state signal when the power voltage is lower than the first predetermined voltage, the first voltage evaluation circuit being operable only when the power voltage is higher than a second predetermined voltage, the first predetermined voltage being higher than the second predetermined voltage;
   a second voltage evaluation circuit, which determines whether or not the power voltage is equal to or lower than the second predetermined voltage, and outputs a second accident state signal when the power voltage is equal to or lower than the second predetermined voltage, the second voltage evaluation circuit being operable when the power voltage is between a third predetermined voltage and the second predetermined voltage, the second predetermined voltage being higher than the third predetermined voltage; and an output circuit, which outputs an alarm signal in response to either of the outputted first or second accident state signals.

2. A sensor unit incorporated in an electric system to which a power voltage is supplied, the sensor unit having a sensor circuit sensing a physical quantity to output a sensor signal responding to the sensed physical quantity, comprising:
a first voltage evaluation circuit, which determines whether or not the power voltage is lower than a first predetermined voltage and outputs a first accident state signal when the power voltage is lower than the first predetermined voltage, the first evaluation circuit being operable only when the power voltage is higher than a second predetermined voltage, the first predetermined voltage being higher than the second predetermined voltage;
a second voltage evaluation circuit, which determines whether or not the power voltage is equal to or lower than the second predetermined voltage, and outputs a second accident state signal when the power voltage is equal to or lower than the second predetermined voltage, the second voltage evaluation circuit being operable when the power voltage is between a third predetermined voltage and the second predetermined voltage, the second predetermined voltage being higher than the third predetermined voltage; and
an output circuit, which outputs an alarm signal in response to either of the outputted first or second accident state signals.

3. A sensor unit as claimed in claim 2, wherein the output circuit outputs
a sensor output signal depending on a the sensor signal outputted from the sensor circuit when the power voltage is over the first predetermined voltage, and
outputs the alarm signal in place of the sensor output signal in response to an output of either of the first or second accident state signals when the power voltage is equal to or below the first predetermined voltage.

4. A sensor unit as claimed in claim 2, wherein a voltage of the alarm signal is set to be higher than a maximum voltage of the sensor output signal, the voltage of the alarm signal having a predetermined margin over the maximum voltage.

5. A sensor unit as claimed in claim 3, wherein the sensor unit further comprising a clamping circuit for clamping a voltage of the sensor output signal at a voltage level distinguished from a voltage of the alarm signal.

6. A sensor unit as claimed in claim 5, wherein the voltage level distinguished from the voltage of the alarm signal is set to be lower than the voltage of the alarm signal with a predetermined margin.

7. A sensor unit as claimed in claim 5, wherein the clamping circuit is configured to freeze an operation thereof if either of the first or second accident state signals is outputted from the first or second voltage evaluation circuit, respectively.

8. A sensor unit as claimed in claim 3, wherein the voltage of the alarm signal is a divided voltage produced by dividing an output voltage of a stabilized power supply independent from the sensor unit by a resistance ratio between a pull-up resistor and a dividing resistor of the output circuit, the pull-up resistor being configured to connect a signal line of the output circuit and the stabilized power supply.

9. A sensor unit as claimed in claim 7, wherein the voltage of the alarm signal is a divided voltage produced by dividing an output voltage of a stabilized power supply independent from the sensor unit by a resistance ratio between a pull-up resistor and a dividing resistor of the output circuit, the pull-up resistor being configured to connect a signal line of the output circuit and the stabilized power supply.

10. The alarm unit as claimed in claim 1, wherein the first voltage evaluation circuit
compares a monitoring voltage that depends on the power voltage with a reference voltage that is independent of the power voltage, and
judges that the power voltage is lower than the first predetermined voltage when the monitoring voltage is lower than the reference voltage.

11. The sensor unit as claimed in claim 2, wherein the first voltage evaluation circuit
compares a monitoring voltage that depends on the power voltage with a reference voltage independent from the power voltage, and
judges that the power voltage is lower than the first predetermined voltage when the monitoring voltage is lower than the reference voltage.

12. The sensor unit as claimed in claim 2, wherein the third predetermined voltage is a ground voltage.

13. A sensor unit as claimed in claim 2, wherein the output circuit
outputs a sensor output signal depending on the sensor signal outputted from the sensor circuit when the power voltage is over the first predetermined voltage, and
outputs the alarm signal in place of the sensor output signal in response to an output of either of the first and second accident state signals when the power voltage is below the first predetermined voltage and is between the third predetermined voltage and the second predetermined voltage.

* * * * *